United States Patent
Fukuda (10) Patent No.: US 9,003,910 B2
(45) Date of Patent: Apr. 14, 2015

(54) INSTRUMENTAL UNIT

(75) Inventor: Taisei Fukuda, Shimada (JP)

(73) Assignee: Yazaki Corporation, Tokyo (JP)

( * ) Notice: Subject to any disclaimer, the term of this patent is extended or adjusted under 35 U.S.C. 154(b) by 379 days.

(21) Appl. No.: 13/606,288

(22) Filed: Sep. 7, 2012

(65) Prior Publication Data

US 2013/0055837 A1   Mar. 7, 2013

(30) Foreign Application Priority Data

Sep. 7, 2011   (JP) ................................. 2011-195365

(51) Int. Cl.
| | |
|---|---|
| F16H 55/18 | (2006.01) |
| H02K 37/16 | (2006.01) |
| G01D 11/02 | (2006.01) |
| G01D 11/18 | (2006.01) |
| H02K 7/116 | (2006.01) |

(52) U.S. Cl.
CPC ........... *H02K 37/16* (2013.01); *Y10T 74/19623* (2015.01); *G01D 11/02* (2013.01); *G01D 11/18* (2013.01); *H02K 7/116* (2013.01)

(58) Field of Classification Search
USPC ............................... 74/411, 409, 412 TA, 440
See application file for complete search history.

(56) References Cited

U.S. PATENT DOCUMENTS

| | | | |
|---|---|---|---|
| 3,203,268 A | | 8/1965 | Manoni et al. |
| 4,711,605 A | * | 12/1987 | Hodlewsky .................... 403/355 |
| 4,763,768 A | * | 8/1988 | Flaig et al. ..................... 192/150 |
| 4,902,162 A | * | 2/1990 | Watt ............................... 403/355 |
| 5,092,440 A | * | 3/1992 | Nakano ......................... 192/55.1 |
| 5,482,128 A | * | 1/1996 | Takaoka et al. ................ 180/444 |
| 5,928,099 A | * | 7/1999 | Tsunemi .......................... 475/83 |
| 5,945,750 A | | 8/1999 | Sauter et al. |
| 8,151,663 B2 | * | 4/2012 | Beutler et al. .................. 74/411 |

FOREIGN PATENT DOCUMENTS

| | | |
|---|---|---|
| CN | 101505075 A | 8/2009 |
| JP | 2002-340631 A | 11/2002 |
| JP | 2005253272 A | 9/2005 |

OTHER PUBLICATIONS

Communication dated Jul. 21, 2014 from the State Intellectual Property Office of P.R. China in a counterpart application No. 201210330800.0.

* cited by examiner

*Primary Examiner* — David M Fenstermacher
(74) *Attorney, Agent, or Firm* — Sughrue Mion, PLLC (57) ABSTRACT

An instrumental unit includes: a step motor; a gear including: a gear body rotated by torque of the step motor, the gear body including a first surface formed with a recess and a second surface opposite to the first surface; and a rotary shaft projecting from the first and second surfaces; a controlling spring accommodated in the recess, a center of the controlling spring through which the rotary shaft projects, the controlling spring having lengths in long and short axis directions orthogonal to each other and having a line-symmetric shape with respect to each of the long and short axis directions; and a case accommodating the step motor, the gear body and the controlling spring, an inner surface of the case including: a first portion supporting the second surface; and a second portion pressing the controlling spring in the recess of the first surface.

5 Claims, 9 Drawing Sheets

FIG.12

INSTRUMENTAL UNIT

BACKGROUND OF THE INVENTION

The present invention relates to an instrumental unit used in a meter apparatus for rotatably supporting a rotary shaft having an indicator, such as an automotive instrument, a marine instrument or an aircraft instrument.

A meter apparatus in which a motor and a gear for transmitting torque from the motor to a rotary shaft are accommodated in a case and also the rotary shaft rotated by the torque transmitted from the gear is rotatably supported in the case is used in various instruments and the like. In such a meter apparatus, a resin spring is integrally formed with the gear in order to reduce a small swing during rotation of the rotary shaft.

However, in the resin spring, settling due to a change with time tends to occur, so that long-term use of the resin spring decreases a force by which the rotary shaft is pressed in a shaft direction, and increases a small swing of the rotary shaft.

Hence, a rotary shaft support structure capable of avoiding an increase in a small swing of a rotary shaft resulting from settling due to a change with time is proposed (for example, see JP-A-2005-253272).

Figure 9:
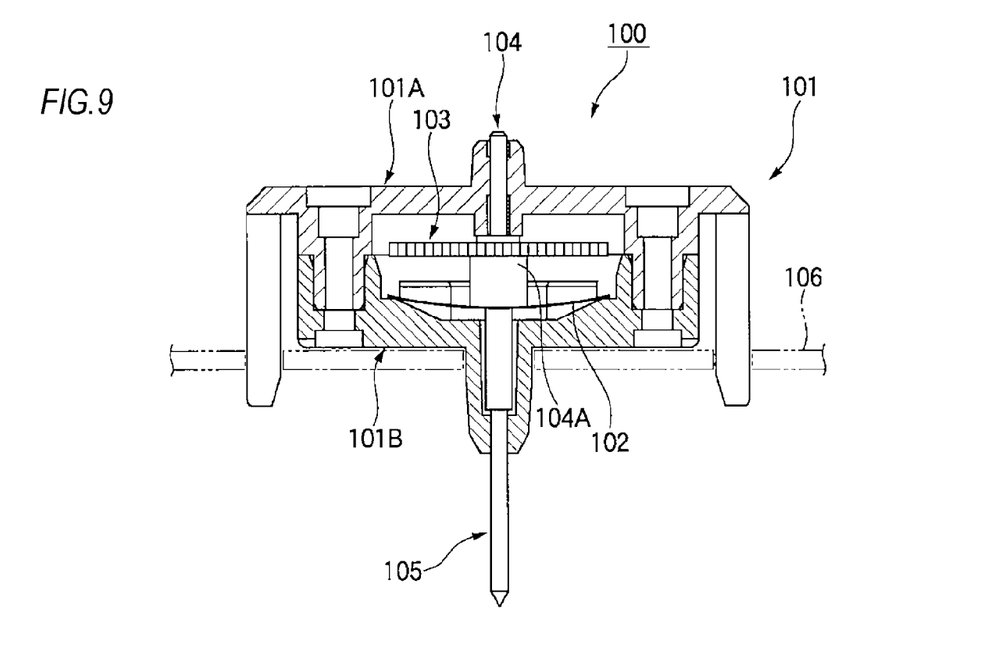
FIG. 9 is a sectional view showing an instrumental unit using a related-art rotary shaft support structure.

That is, in the rotary shaft support structure, a thrust leaf spring (hereinafter abbreviated as a "leaf spring") 102 made of a flat plate-shaped metal is placed between a gear 103 and a case 101 so as to be able to curve inside the case 101 which includes an upper case 101A and a lower case 101B and is fixed to a wiring board 106 as shown in FIG. 9. As a result, an indicator (not shown) or an indicator shaft 105 to which the indicator is attached can rotate smoothly.

Figure 10:
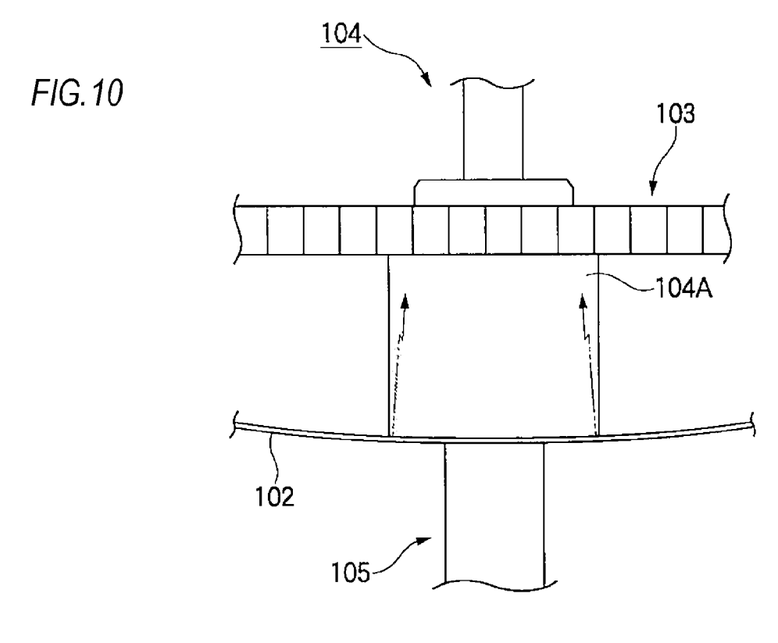
FIG. 10 is an explanatory diagram showing action of a leaf spring used in the related-art rotary shaft support structure.
Figure 11:
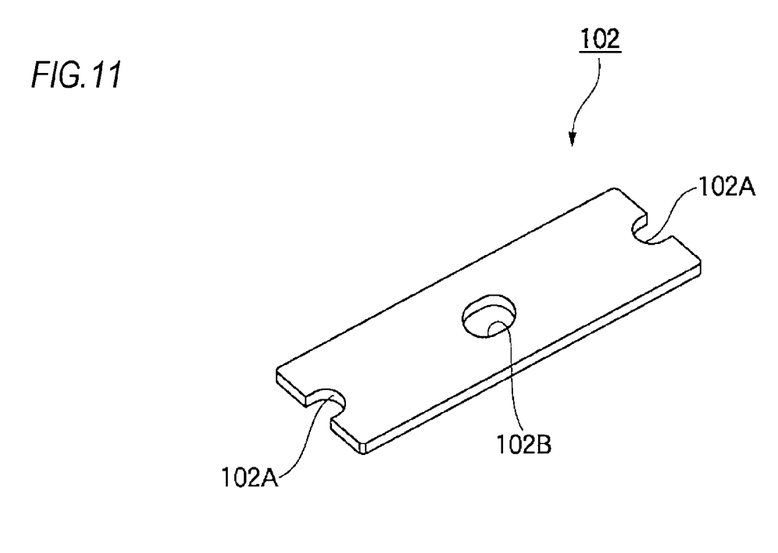
FIG. 11 is a perspective view showing a shape of the leaf spring used in the related-art rotary shaft support structure.

In the rotary shaft support structure, a rotary shaft 104 integrally extending from the indicator shaft 105 is inserted into a hole 102B (see FIG. 11) of the center of the leaf spring 102 as shown in FIG. 10. Also, a boss 104A secured to the rotary shaft 104 is pushed on the leaf spring 102 and thereby, the leaf spring 102 is bent in a curved state and a reaction force from the leaf spring 102 at that time is used as a load, and thus, a controlling force on the rotary shaft 104 is generated.

Also, in the rotary shaft support structure of such a meter apparatus, there is a configuration in which light from a light source is captured from the proximal end of a rotary shaft and also the light is guided to the distal end through the inside of the rotary shaft and the rotary shaft is formed of a transparent material with good light guiding properties in order to illuminate an indicator attached to the distal end of the rotary shaft (hereinafter called a "light guiding combined type").

Incidentally, in the rotary shaft support structure of the meter apparatus with the configuration as described above, the leaf spring 102 is installed downwardly (the side of the lower case 101B) with respect to the gear 103. Such a structure requires relatively large installation space in a thickness direction of the case 101 because of the circumstances in which, for example, it is necessary to provide the boss 104A in contact with the leaf spring 102 in order to install the leaf spring 102.

Particularly, for a structure in which various gears for transmitting torque from a motor to a rotary shaft are collectively laminated vertically rather than juxtaposed horizontally, these gears in addition to the boss described above are stacked, so that a thickness of the case becomes thicker. Such a structure is particularly unsuitable for miniaturization and thinning in recent years in which demands for miniaturization and thinning of the meter apparatus are increasing.

Also, in the rotary shaft support structure of the meter apparatus with the configuration as described above, the rotary shaft 104 or the indicator shaft 105 pressed by an elastic force is also in a state greatly displaceable in a shaft direction, and the position tends to become unstable. As a result, a turning movement of the indicator is also lacking in smoothness and this may lead to a very unstable indicator movement.

SUMMARY

The invention provides an instrumental unit capable of obtaining a stable turning movement of a rotary shaft and thus a smooth rotational movement of an indicator by a stable controlling movement of a load spring.

An aspect of the invention provides an instrumental unit comprising: a step motor; a gear including: a gear body configured to be rotated by torque of the step motor, the gear body including a first surface formed with a recess and a second surface opposite to the first surface; and a rotary shaft projecting from the first and second surfaces of the gear body; a controlling spring accommodated in the recess of the first surface of the gear body, a center of the controlling spring through which the rotary shaft projects, the controlling spring having lengths in a long axis direction and in a short axis direction which are orthogonal to each other and having a line-symmetric shape with respect to each of the long and short axis directions; and a case accommodating the step motor, the gear body and the controlling spring, an inner surface of the case including: a first portion supporting the second surface of the gear body; and a second portion configured to press the controlling spring in the recess of the first surface of the gear body.

The controlling spring may have an oval shape or an elliptic shape in which a hole through which the rotary shaft projects is formed, and the second portion may include a spring pressing member which projects from the inner surface of the case toward the controlling spring and an end surface of which is configured to be in contact with the controlling spring.

The controlling spring may be a leaf spring in which: a cross section along the long axis direction has a shape curved in substantially a U shape toward the first portion of the inner surface of the case; a cross section along the short axis direction has a shape curved in substantially a U shape toward the second portion of the inner surface of the case; and both end portions in the long axis direction have folded shapes warped in a direction apart from the recess of the first surface of the gear body.

The inner surface of the case may include a stopper member an end surface of which is capable of being in contact with the first surface of the gear body. A distance between the end surface of the stopper member and the first surface of the gear body may be less than a distance between the end surface of the spring pressing member and a bottom surface of the recess of the first surface of the gear body.

The first portion of the inner surface of the case may include a bearing which supports the rotary shaft projecting from the second surface of the gear body, and the second portion of the inner surface of the case may include a shaft hole which supports the rotary shaft projecting from the first surface of the gear body.

DETAILED DESCRIPTION OF EMBODIMENTS

An embodiment of the invention will hereinafter be described in detail with reference to the accompanying drawings.

Figure 1A:
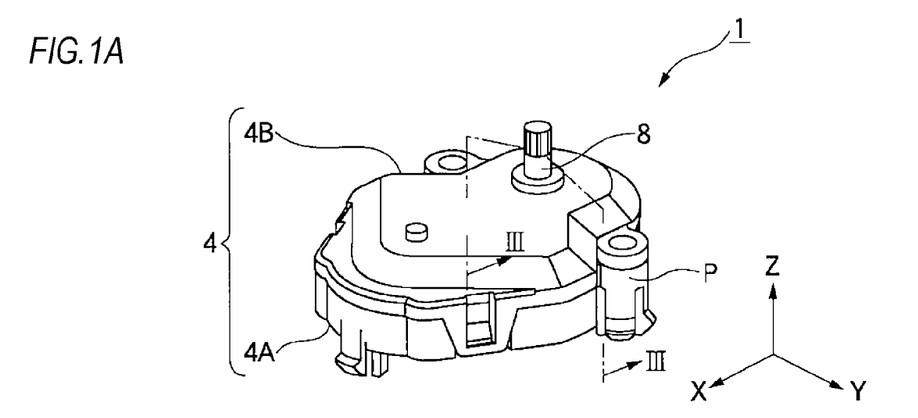
FIG. 1A is a perspective view of an instrumental unit according to an embodiment of the invention.
Figure 1B:
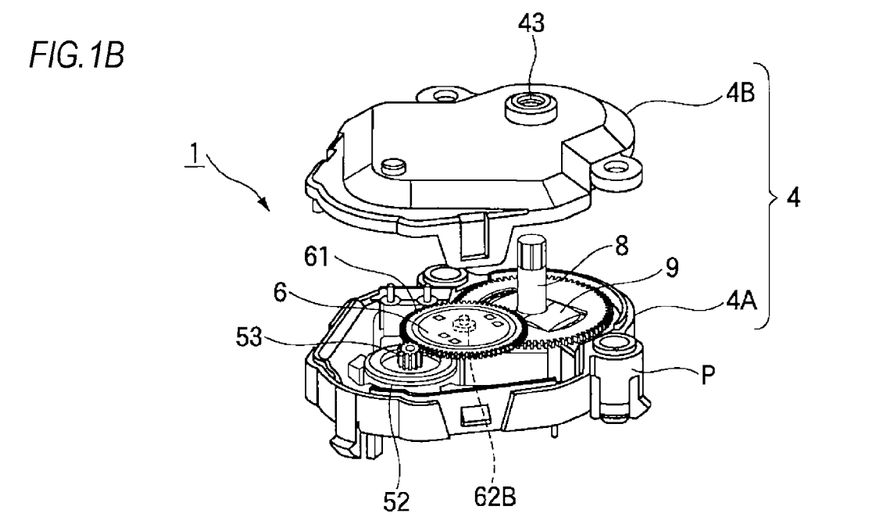
FIG. 1B is an exploded perspective view of a case of the instrumental unit.
Figure 2:
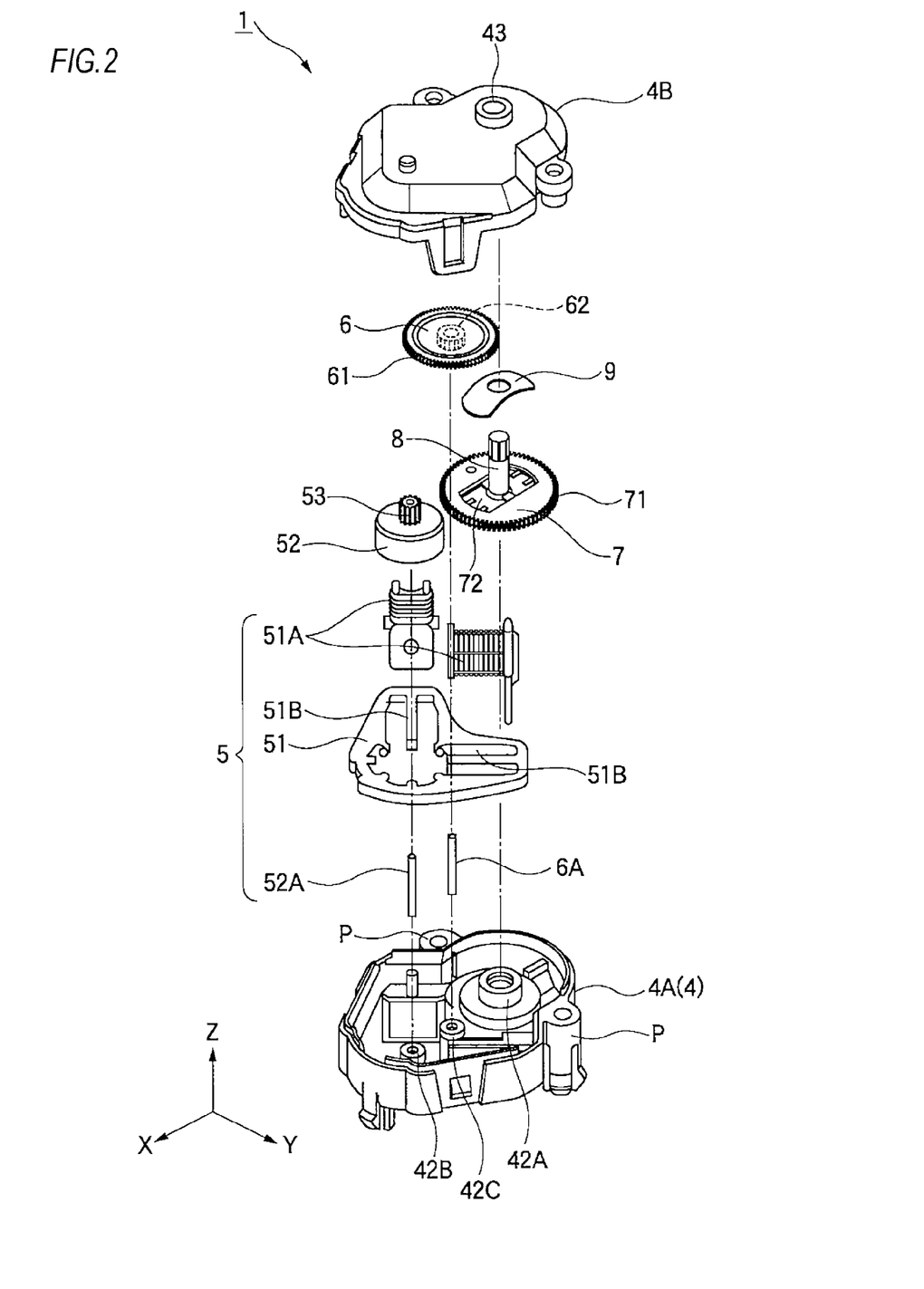
FIG. 2 is an exploded perspective view of components of the instrumental unit according to the embodiment of the invention.

FIGS. 1A, 1B and 2 show an instrumental unit 1 according to the embodiment of the invention.

In the instrumental unit 1, movement components such as a step motor 5, a reduction gear train and a rotary shaft 8 are accommodated in a motor case 4.

Figure 3:
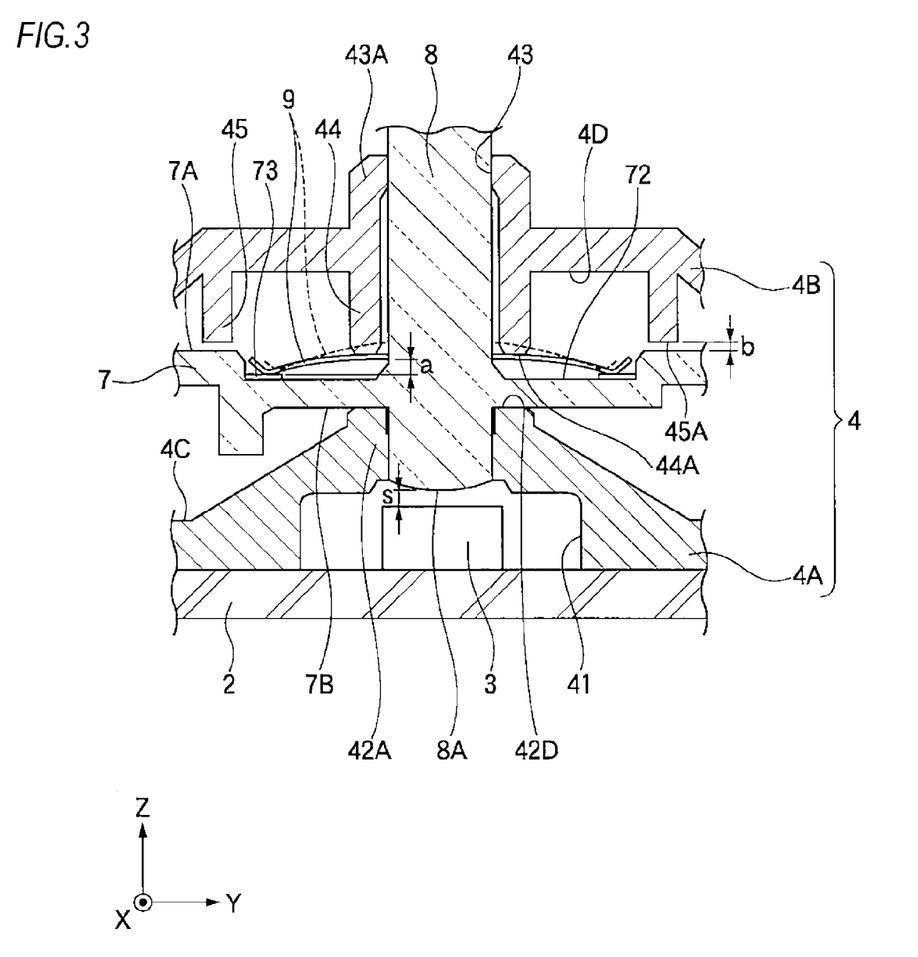
FIG. 3 is an enlarged sectional view of a part of the instrumental unit according to the embodiment of the invention.

A meter apparatus to which the instrumental unit 1 is attached includes a light source 3 mounted on a substrate 2 shown in FIG. 3, the instrumental unit 1 attached to a predetermined place on the substrate 2 including a region equipped with the light source 3, and a display plate (not shown) which is installed over the instrumental unit 1 and which displays necessary information about a vehicle body and ambient environment of a vehicle with numeric characters, characters, and symbols, by an indicator (not shown).

The meter apparatus to which the instrumental unit 1 of the embodiment is applied constructs a part of the combination meter (not shown), and constructs a facing plate with the display plate forming the front side, fitted on the whole surface. Also, various display windows for installing various instruments and the like including the instrumental unit 1 are opened in the display plate, and the display plate is integrated with a combination meter case constructing the side and rear surfaces. Further, the top of the display plate is covered with a transparent cover glass (not shown) of a black color.

In addition, the meter apparatus to which the instrumental unit 1 is applied constructs, for example, a speedometer in the embodiment. In this case, the present speed is displayed in an analog manner by turning an indicator described below by a predetermined angle and indicating a specific numeric character formed on the display plate (not shown) based on a sensor signal corresponding to the present speed detected by a sensor (not shown).

The light source 3 of the embodiment includes, for example, an LED (Light Emitting Diode) for emitting visible light of a predetermined wavelength ($\lambda$), and is mounted on the substrate 2 just under the rotary shaft 8 as opposed to an end face 8A of the lower side of the rotary shaft 8 described below. In the LED which is the light source 3 of the embodiment, the optical axis is set in a Z direction perpendicular to an upper surface of the substrate 2 and most of the light (hereinafter called "illuminating light") from the LED is emitted toward the end face 8A of the lower side of the rotary shaft 8 just over the LED. In addition, it is constructed so that the illuminating light incident from the end face 8A of the lower side of the rotary shaft 8 is guided to the distal end of the upper side of the rotary shaft 8 projecting from the upper portion of the motor case 4 and the indicator (not shown) press-fitted to the upper end is illuminated.

The motor case (hereinafter called a case) 4 includes a lower case 4A secured to the substrate 2, and an upper case 4B integrally assembled in a state stacked on the lower case 4A. The step motor 5, an intermediate gear 6, an output gear 7 and the rotary shaft (but excluding the distal end of the upper side of the rotary shaft) 8 intagrally provided with the output gear 7 are accommodated in the motor case 4.

Furthermore, in the motor case 4, a leaf spring (hereinafter called a "controlling spring") 9 described below in detail is accommodated in the output gear 7 in a state assembled between the output gear 7 and the upper case 4B. Concretely, the controlling spring 9 is accommodated in a recess 72 formed on the center side of one surface (hereinafter called an "upper surface") 7A of the output gear 7, and this will be described below in detail. In addition, the distal end of the upper side of the rotary shaft 8 projects to the outside of the case 4, and the indicator (not shown) is fitted into an end face of the upper side in a pressed-in state.

The lower case 4A has substantially a box shape whose top is opened. Also, the lower case 4A is provided with cylindrical protrusions P projecting toward a lower part (−Z direction) on both right and left side surfaces, and the cylindrical protrusions P are respectively fitted into fixing holes (not shown) opened in the substrate 2.

Also, a bearing 42A cylindrically projecting from the center of a recess 41 (shown in FIG. 3) formed in the lower surface toward an upper part (a direction of the upper case 4B), in other words, projecting from the side of an inner surface (a floor surface 4C) toward a roof surface 4D of the upper case 4B is formed inside the lower case 4A. Further, a cylindrical bearing 42B and a bearing 42C slightly projecting toward the direction of the upper case 4B are respectively formed on the floor surface 4C of the lowercase 4A in predetermined positions as shown in FIG. 2.

The bearing 42A of the lower case 4A also functions as support means (that is, a lower bearing) for rotatably supporting the other surface (hereinafter called a "lower surface") 7B which is a surface opposite to the upper surface 7A of the output gear 7. In addition, it is unnecessary to use the bearing 42A of the case floor surface side for pivotally supporting the lower side of the rotary shaft 8 as shown in the embodiment, as the support means for supporting the lower surface 7B of the output gear 7. For example, a cylindrical dedicated member for supporting the lower surface opposed to the recess 72 of the output gear 7 may be independently erected from the side of the floor surface 4C.

On the other hand, in the upper case 4B, a shaft hole 43 is bored in a bearing 43A of the just upper portion of the bearing 42A in correspondence with the bearing 42A formed concentrically with the center of the recess 41 (see FIG. 3) of the lower case 4A. The end of the upper side of the rotary shaft 8 is rotatably inserted through the shaft hole 43. Further, in the upper case 4B, bearings (not shown) are respectively formed in the inner surface, that is, the roof surface 4D just over the bearing 42B and the bearing 42C in correspondence with the bearing 42B and the bearing 42C of the lower case 4A.

Also, the portion opposed to the recess 72 of the side of the upper surface 7A of the output gear 7 in the roof surface 4D of the upper case 4B is integrally provided with a spring pressing member 44 in a state downwardly projecting from the roof surface 4D by a predetermined length as shown in FIG. 3.

The spring pressing member 44 has substantially a cylindrical shape whose lower end side is opened. Then, the spring pressing member 44 depresses an upper surface of the controlling spring 9 when the controlling spring 9 is accommodated in the recess 72 of the output gear 7 and the upper case 4B is finally integrally assembled to the lower case 4A.

That is, the spring pressing member 44 presses the controlling spring 9 until the controlling spring 9 is accommodated in the recess 72, in other words, until the height of the controlling spring 9 becomes lower than the depth of the recess 72, and the controlling spring 9 is pinched between the spring pressing member 44 and the recess 72 of the output gear 7. At this time, at least a part of the region of a distal end surface (hereinafter called a "lower end surface") 44A of the spring pressing member 44 always abuts on the upper surface of the controlling spring 9.

Further, a stopper member 45 is integrally formed with the roof surface 4D of the upper case 4B as shown in FIG. 3. The stopper member 45 is means for inhibiting the rotary shaft 8 from being together pulled up in the case of pulling out the indicator assembled to the distal end of the rotary shaft 8, and is projected from an inner surface of the upper case 4B toward the upper surface 7A of the output gear 7.

The stopper member 45 is provided to have a gap between the stopper member 45 and the upper surface 7A of the output gear 7 by a predetermined distance b when the rotary shaft 8 is housed in the case 4, and inhibits the output gear 7 and the rotary shaft 8 from moving upwardly further by making contact between the upper surface 7A of the output gear 7 and a lower end surface 45A of the stopper member 45 in the case of being integrally pulled up by a pull-out force of the indicator when the indicator is pulled out.

In addition, the gap b is a gap for enabling the output gear 7 to swing within a predetermined play range in a shaft direction of the rotary shaft 8 through the controlling spring 9 displaceable vertically. This gap b is provided by separating the lower end surface 45A of the stopper member 45 from the upper surface of the output gear 7 by a predetermined distance.

In the stopper member 45 of the embodiment, a distal end surface, namely the lower end surface 45A of the stopper member 45 presses on the upper surface 7A of the output gear 7 in the case of moving to the maximum of a predetermined play range when the rotary shaft 8 is pulled up together with the indicator beyond the predetermined play range. Consequently, the rotary shaft 8 is inhibited from moving upwardly further.

The step motor 5 is means for turning the indicator (not shown), and turns the rotary shaft 8 while decelerating through the reduction gear train, that is, the intermediate gear 6 and the output gear 7 (it may be configured to decelerate by a single gear rather than the gear train). Then, by turning the rotary shaft 8, the indicator integrally provided with the rotary shaft 8 is turned along a surface of the display plate to indicate various items of necessary information. As shown in FIG. 2, the step motor 5 of the embodiment includes a stator 51, and a rotor 52 attached to a rotor shaft 52A disposed in the opened center of the stator 51.

In addition, a rotor gear 53, the intermediate gear 6 and the output gear 7 constructing the reduction gear train of the embodiment are juxtaposed in a state in which a part of the reduction gear train is laminated so as to stagger the adjacent gears in a rotational plane (X-Y) direction and in a state in which a part of the reduction gear train is laminated and arranged separately from the adjacent gears by a slight gap in a thickness (Z) direction. Because of this, installation space in the X-Y direction can be reduced since a part of the reduction gear train is multilayered and arranged so as not to make contact vertically even when the height of the Z direction is not increased. As a result, the case 4 itself is also suitable for miniaturization and thinning.

The stator 51 is fixed to the lower case 4A and also, magnetic cores 51B, which are magnetic poles, are projected toward the opened center of the stator 51, and coils 51A wound on bobbins are attached to the magnetic cores 51B.

The rotor 52 is formed of a proper magnetic material in substantially a cylindrical shape and is rotatably installed in the opened center of the stator 51, and a small-diameter rotor gear 53 with a small number of teeth is concentrically secured to the top and also plural magnets are fastened to the outer peripheral surface. In addition, the rotor shaft 52A to which the rotor 52 is attached is rotatably supported between the bearing 42B formed on the lower case 4A and the bearing (not shown) formed on the upper case 4B as shown in FIG. 2.

The intermediate gear 6 is fastened to a support shaft 6A, and the support shaft 6A is rotatably supported between the bearing 42C formed on the lower case 4A and the bearing formed on the upper case 4B. In this intermediate gear 6, a main wheel 61 with a large number of teeth formed on the outer periphery meshes with the rotor gear 53 of a pinion fastened to the top of the rotor 52, and a rotational speed from the rotor 52 is decreased and is transmitted. Also, on a lower surface of the intermediate gear 6, a small-diameter pinion 62 with a small number of teeth is coaxially fastened integrally to the support shaft 6A.

The output gear 7 is integrally provided with the rotary shaft 8 in the vicinity of the middle of the rotary shaft 8 in order to transmit torque from the pinion 62 of the intermediate gear 6 to the rotary shaft 8. In addition, the output gear 7 of the embodiment is integrally molded with the rotary shaft 8 described below with a proper transparent resin material.

In the output gear 7, a main wheel 71 with a large number of teeth formed on the outer periphery meshes with the pinion 62 formed on the lower surface of the intermediate gear 6, and a rotational speed of the intermediate gear 6 is further decreased and is transmitted to the output gear 7 and the output gear 7 rotates. As shown in FIG. 3, the rotary shaft 8 is formed on the output gear 7 in a state projecting from the upper surface and the lower surface of the output gear 7 constructing a disk-shaped gear body whose side surface is provided with the main wheel 71 so as to be aligned with a gear shaft of the output gear 7. As a result, the rotary shaft 8 can turn integrally at the same angular speed as that of the output gear 7 decreased greatly and turn the indicator (not shown) with high accuracy.

Figure 4:
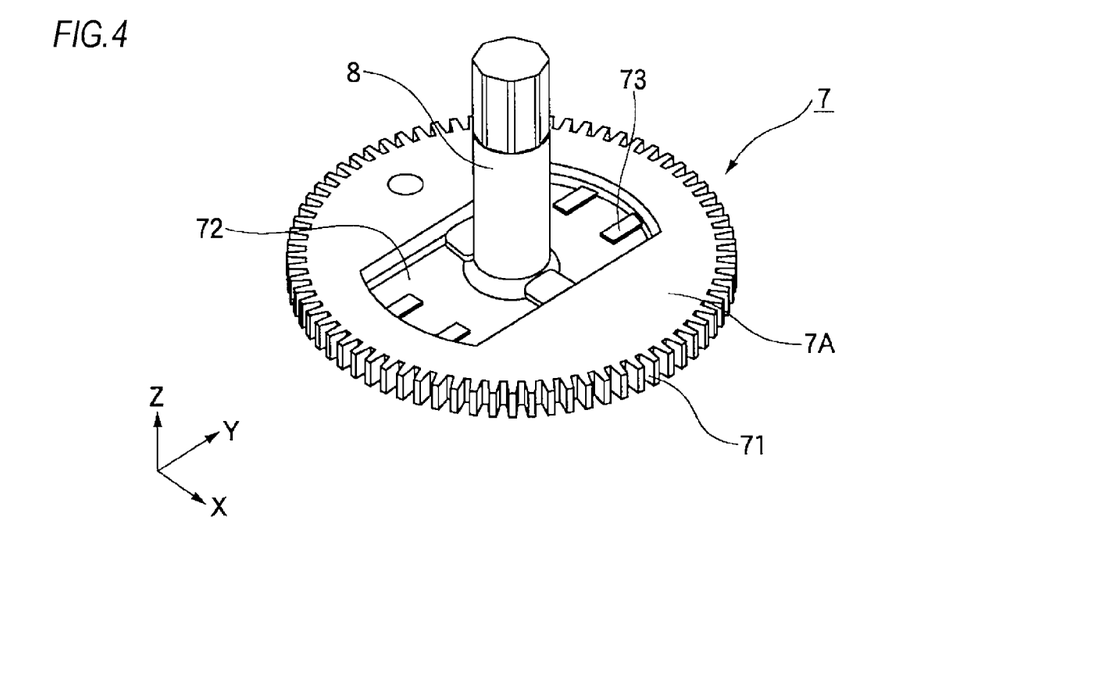
FIG. 4 is a perspective view showing an output gear and a rotary shaft included in the instrumental unit according to the embodiment of the invention.

Also, as shown in FIGS. 3 and 4, the recess 72 for accommodating the controlling spring 9 through which the rotary shaft 8 projecting from the center of the upper surface of the output gear 7 extends is formed in the upper surface of the output gear 7 so as to surround the rotary shaft 8. The recess 72 of the embodiment has substantially an oval shape equal to that of the controlling spring 9 described below, and has a shape slightly larger than an external shape of the controlling spring 9. In addition, the "oval shape" herein refers to a shape with a different ratio of lengths of two (X, Y) directions along the two orthogonal axes, in other words, substantially a rectangular shape having a long side and a short side, and particularly, the short side portion has substantially a circularly arc shape and the long side portion has a linear shape.

Figure 5:
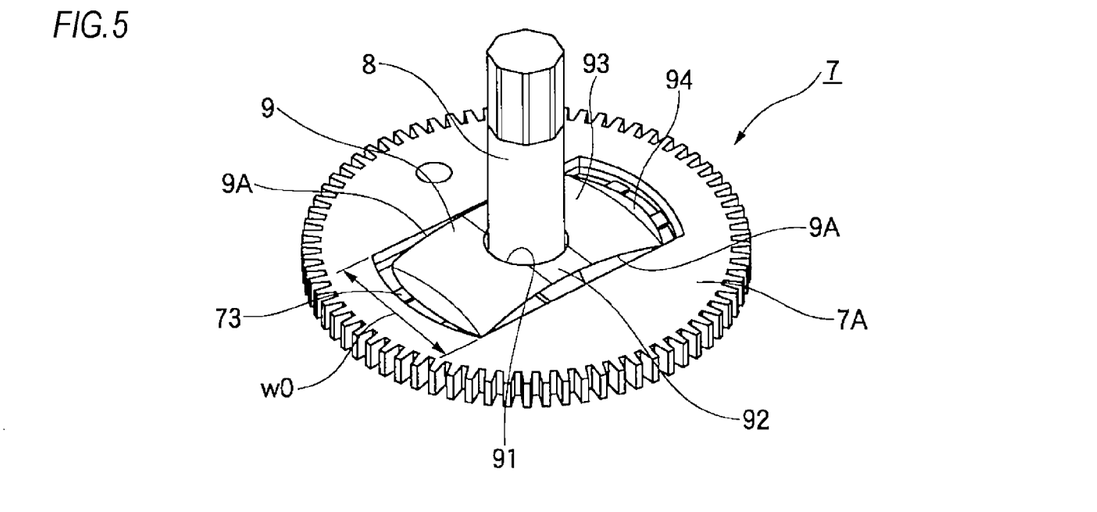
FIG. 5 is a perspective view showing a state in which a controlling spring is mounted in the output gear included in the instrumental unit according to the embodiment of the invention.
Figure 7A:
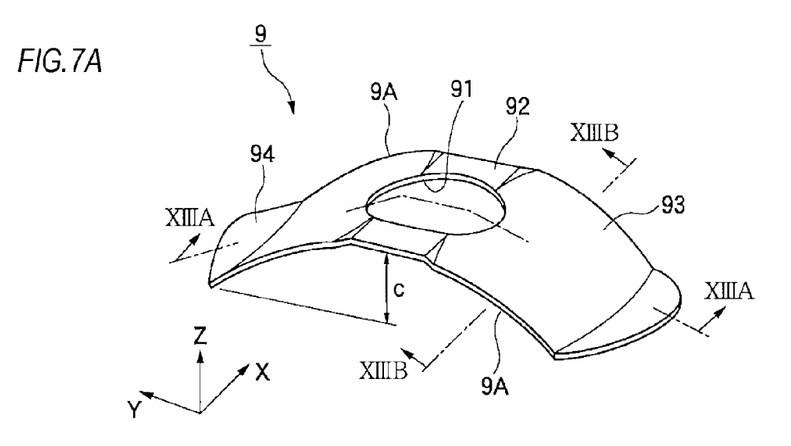
FIG. 7A is a perspective view showing a natural length state of the controlling spring included in the instrumental unit according to the embodiment of the invention.
Figure 7B:
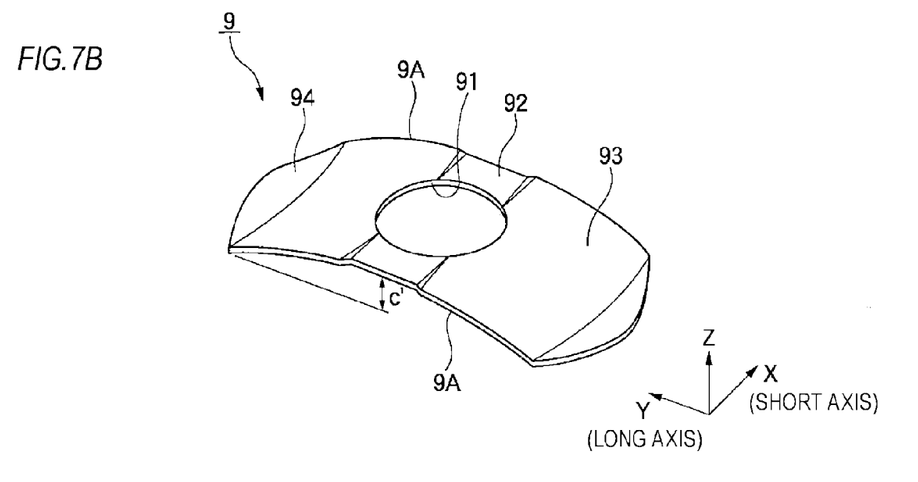
FIG. 7B is a perspective view showing a state in which the controlling spring included in the instrumental unit according to the embodiment of the invention is pressed and is bent in a flat direction.

The recess 72 of the output gear 7 has a depth slightly smaller than (or nearly equal to) a height c in a natural state of the controlling spring 9 shown in FIGS. 7A and 7B. Also, in this recess 72, the rotary shaft 8 projects from the center as shown in FIG. 4, and four places near to the corners surrounding the rotary shaft 8 are provided with pedestals 73 projecting from a bottom surface of the recess 72 by a slight height h (where h<<H). Then, the pedestals 73 are equipped with the short sides of the controlling spring 9 as shown in FIG. 5.

The details will be described below, and the rotary shaft 8 is installed movably within the predetermined play range described above along a direction of this axis line (Z) while being downwardly depressed by an elastic force (spring force) of the controlling spring 9 arranged in the recess 72 of the output gear 7. On the other hand, according to this, in order to cause the pinion 62 meshing with the main wheel 71 of the output gear 7 to always mesh with the main wheel 71 of the output gear 7 within the movable range described above, the teeth of this pinion 62 are formed longer along the direction of the axis line (Z).

In other words, the pinion 62 functions as slide means for moving the output gear 7 and the rotary shaft 8 in the direction of the axis line (Z) within the play range as well as means for transmitting torque to the main wheel 71 of the output gear 7 slidable in the direction of the axis line.

Incidentally, the output gear 7 and the rotary shaft 8 are normally depressed by the controlling spring 9 and are stable in the lowest position, so that the output gear 7 and the rotary shaft 8 can move upwardly from the lowest position within the play range.

The rotary shaft 8 functions as light guiding means for guiding illuminating light from the light source 3 to the indicator as well as means for rotating the indicator (not shown). As a result, the rotary shaft 8 is integrally molded with the output gear 7 with a proper translucent resin material having good light guiding properties, and particularly, the rotary shaft 8 is molded integrally in a state in which the direction of the axis line is directed in a direction perpendicular to a rotational plane of the output gear 7. The rotary shaft 8 of the embodiment has substantially a columnar shape in order to guide the illuminating light from the light source 3 to the indicator, and the outside diameter is made thicker than that of a rotary shaft without a light guiding function in order to ensure a necessary amount of passage light.

Also, the upper side of the rotary shaft 8 projects from the shaft hole 43 of the upper case 4B to the outside of the case 4 as described above, and the indicator is press-fitted in the upper end projecting to the front side of the display plate and is assembled. As described above, the upper portion of the rotary shaft 8 is rotatably inserted and supported in the shaft hole 43 of the side of the upper case 4B and also, the lower portion of the rotary shaft 8 is rotatably inserted and supported in the bearing 42A formed on the lower case 4A.

As described above, the end face 8A of the lower end of the rotary shaft 8 is installed just over the light source 3 and is opposed to the light source 3. Therefore, when illuminating light from the light source 3 enters the end face 8A, most of that illuminating light is guided while repeating reflection (for example, total reflection or regular reflection) at the interface to a peripheral surface of the inside of the rotary shaft 8, and propagates toward an end face of the upper side.

Since the rotary shaft 8 is urged downwardly by the controlling spring 9 described below, the lower surface 7B of the output gear 7 normally abuts on an upper surface 42D of the bearing 42A and the rotary shaft 8 is accommodated in a state descending to the lowest position in the play range as shown in FIG. 3. Therefore, the main wheel 71 of the output gear 7 integrally molded with the rotary shaft 8 can mesh with the pinion 62 longer formed in the shaft direction in a state displaceable along the direction of the axis line.

Figure 6:
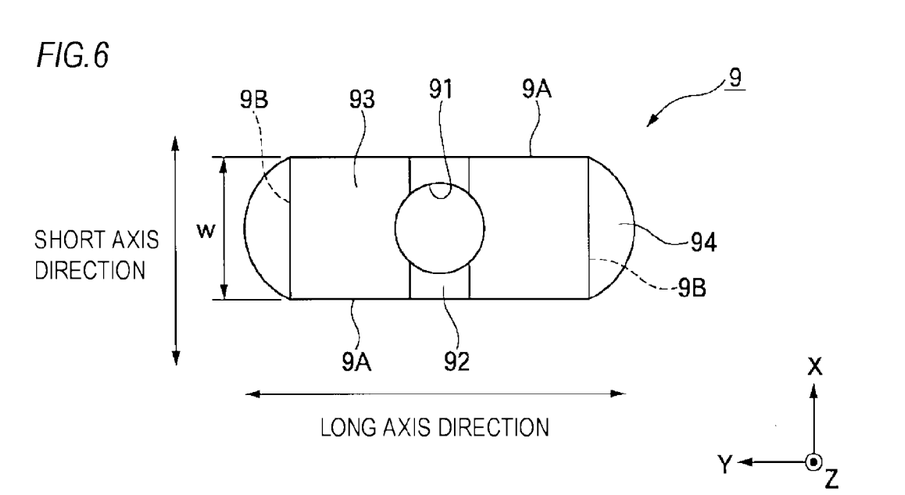
FIG. 6 is a plan view showing the controlling spring included in the instrumental unit according to the embodiment of the invention.

As shown in FIG. 6, the controlling spring 9 is a spring obtained by cutting a proper metallic thin plate having flexibility in each line-symmetric specific shape with respect to each axis direction with different lengths of directions of the two orthogonal axes (X, Y), particularly in substantially an oval shape (or an elliptic shape) in the embodiment. The controlling spring 9 has substantially an oval shape of biaxial symmetry having a flat surface 92 in which a hole 91 described below is opened in the center, wing parts 93 extending from the flat surface 92 toward both long axis directions downwardly (−Z) in substantially a U-shaped cross section, and folded-back parts 94 in which the ends in both long axis (±Y) directions beyond the wing parts 93 are folded upwardly. The wing parts 93 with such a shape produce a spring force (elastic force) of the size according to the amount of displacement Δc (=c−c'; see FIGS. 7A and 7B) in a curved thickness (Z) direction.

The hole 91 of the controlling spring 9 is opened in at least a perfect circle shape having an opening dimension slightly larger than an outside diameter dimension of the rotary shaft 8 or a slightly elliptic shape in order to be able to cope with displacement of the controlling spring 9, and the upper side portion of the rotary shaft 8 extends through the hole 91.

Figure 8A:
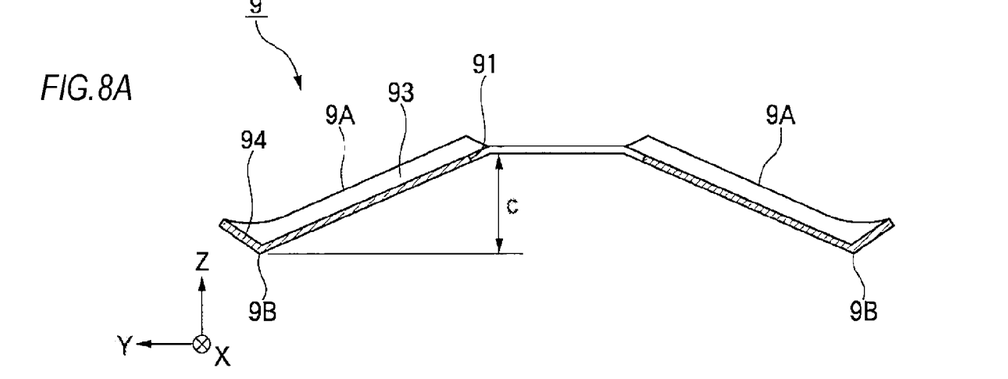
FIG. 8A is a sectional view taken on line VIIIA-VIIIA in FIG. 7A.
Figure 8B:
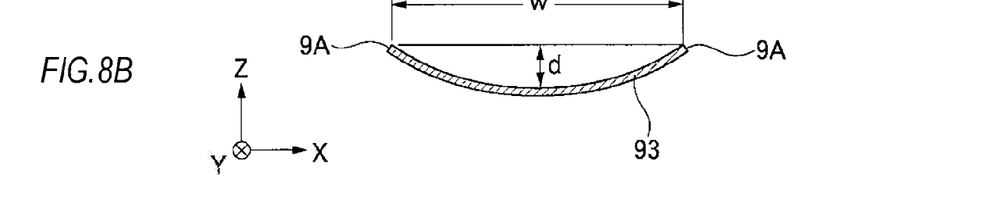
FIG. 8B is a sectional view taken on line VIIIB-VIIIB in FIG. 7A.

Also, the wing parts 93 of the controlling spring 9 have a curved surface shape rippling in substantially a U-shaped cross section toward a bottom surface of the recess 72 in a natural state in which an external force is not applied as shown in FIGS. 7A and 8B. That is, when the controlling spring 9 is in the natural state, a difference (c) in height in the thickness (Z) direction of the wing parts 93 having a mound-shaped cross section along the long axis (Y) direction becomes large, and the amount of displacement of the controlling spring 9 associated with upward and downward movement of the output gear 7 can be ensured sufficiently. Similarly, a curve depth (d) in the thickness (Z) direction of the wing parts 93 having substantially a U-shaped cross section along the short axis (X) direction becomes large (see FIG. 8B).

In addition, the controlling spring 9 is placed in a state in which surfaces (hereinafter called "the lowest surfaces") 9B of the lowest portions of the boundaries between the wing parts 93 and the folded-back parts 94 are supported on the pedestals 73 projecting from the bottom surface of the recess 72 of the output gear 7 as shown in FIG. 5. That is, the controlling spring 9 of the embodiment is accommodated in a state in which the two lowest surfaces 9B make contact (line contact or surface contact) with the pedestals 73 formed in the vicinity of the four corners of the bottom surface of the recess 72 of the upper surface 7A of the output gear 7.

Also, both edges in the short axis direction of the wing parts 93, namely a pair of long side parts 9A makes contact with the lower end surface 44A of the spring pressing member 44 formed on the side of the roof surface 4D of the inside of the upper case 4B, and a sliding movement is performed between the long side parts 9A and the lower end surface 44A with a rotational movement of the output gear 7. That is, a pressing force acts on the long side parts 9A of both wing parts 93 facing the hole 91 in the downward (−Z) direction from the spring pressing member 44 formed on the side of the roof surface 4D of the inside of the upper case 4B toward the recess 72 of the output gear 7 as shown in FIG. 3. As a result, a stable rotational movement of the rotary shaft 8 is ensured by producing an elastic force (spring force) toward the downward (−X) direction vertical to the rotary shaft 8 through the output gear 7.

In addition, the length (width w shown in FIG. 6) in the short axis direction of the wing parts 93 substantially matches with the size of a width dimension (short side width w0 shown in FIG. 5) of the recess 72 of the output gear 7, and backlash of the controlling spring 9 at the time of rotation of the output gear 7 is reduced by preventing a gap between the widths w and w0 from occurring.

The folded-back part 94 has a rounded or chamfered shape in which an end face has no edge, and each end is upwardly folded and thereby, the edge is prevented from catching on a peripheral wall surface of the recess 72 or the pedestals 73. Also, the folded-back parts 94 are constructed so as to increase a function of sliding on the lowest surfaces 9B by having a folded shape and be able to smoothly slide on the pedestals 73 when the controlling spring 9 is bent. In addition, the controlling spring 9 is preferably made of metal in order to stabilize weight.

Here, in the instrumental unit 1 of the embodiment, a relation of the following formula holds among at least a distance a (see FIG. 3) between the lower end surface 44A of the spring pressing member 44 and the pedestals 73 on the bottom surface of the recess 72 of the output gear 7, a distance b (see FIG. 3) between the distal end surface 45A of the stopper member 45 and the upper surface 7A of the output gear 7, and the maximum height (that is, a difference in height in natural length) c (see FIGS. 8A and 8B) in a natural state of the controlling spring 9.

$$c>a>b \quad (1)$$

In addition, the reasons why it is configured to have such a relation are as follows.

That is, for the relation of an inequality sign of c>a, the size of a gap in a vertical direction to arrange the controlling spring 9 is mathematized as a requirement in order to arrange the controlling spring 9 in a state in which the controlling spring 9 can exert a necessary elastic force.

On the other hand, for the relation of an inequality sign of a>b, the relation is a requirement for preventing the controlling spring 9 from changing in a perfect flat state when the rotary shaft 8 is together pulled in the case of pulling the indicator out of the rotary shaft 8. That is, the minimum necessary size in which the size of a gap pinched does not become zero is mathematized as the requirement.

Consequently, occurrence of trouble in which the controlling spring 9 is greatly crushed to cause permanent deformation and thereby the elastic force of the controlling spring 9 is impaired can be avoided. As a result, when the indicator is again attached and used, the controlling spring 9 can again exert the necessary elastic force, so that a necessary controlling force (spring load) can again be ensured.

When the spring pressing member 44 and the stopper member 45 are designed to satisfy the formula (1), the lower end surface 45A of the stopper member 45 is positioned in the upward direction separate from the output gear 7 by a distance of less than the depth of the recess 72 from the lower end surface 44A of the spring pressing member 44 making contact with the controlling spring 9.

Here, action of the controlling spring 9 will be described.

When the controlling spring 9 and the rotary shaft 8 integrally provided with the output gear 7 are assembled between the lower and upper cases 4A, 4B, the spring pressing member 44 drooping from the roof surface 4D of the upper case 4B depresses the controlling spring 9 mounted in the recess 72 of the output gear 7 as shown in FIG. 3. That is, the lower end surface 44A of the spring pressing member 44 presses on the long side parts 9A of the controlling spring 9 from above in a line contact state (in some cases, a surface contact state when the output gear 7 rises to a maximum).

The controlling spring 9 having flexibility causes elastic deformation which tends to return to a curved shape which is a natural state. As a result, the output gear 7 in which the pedestals 73 of the recess 72 abut on the lowest surfaces 9B of the controlling spring 9 in a surface contact (or line contact) state, and the rotary shaft 8 integrally provided with the output gear 7 are urged in the downward direction (−Z direction) of the axis line direction of the rotary shaft 8 by an elastic force as shown in FIG. 3. That is, the rotary shaft 8 is always elastically controlled by the controlling spring 9.

In this manner, a small swing of the rotary shaft 8 can be prevented by the controlling spring 9. Also, since the rotary shaft 8 is depressed toward the downward portion including the light source 3 thus, an approaching state is always held at a distance S (see FIG. 3) between the light source 3 and the end face 8A of the lower end side of the rotary shaft 8. As a result, while minimizing a leak of illuminating light emitted from the light source 3 to the outside, the illuminating light can be captured from the end face 8A to the rotary shaft 8, so that light guiding performance improves accordingly.

Figure 12:
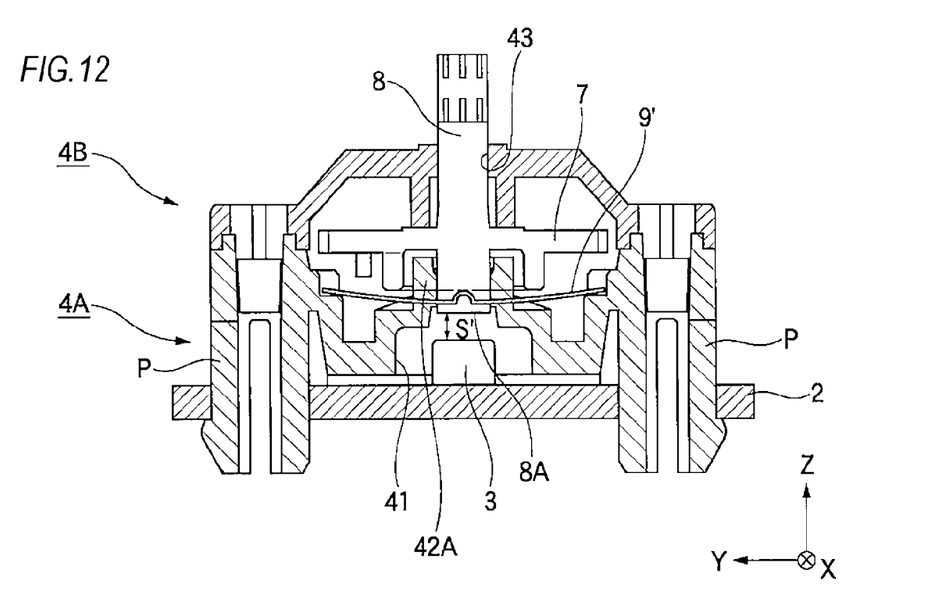
FIG. 12 is a sectional view of an instrumental unit shown as a comparative example, capable of being derived from the related-art rotary shaft support structure.

In order to describe the good light guiding performance of the instrumental unit 1 according to the embodiment described above, the instrumental unit 1 is compared with an instrumental unit (a comparative example) capable of being derived from a related-art rotary shaft support structure. FIG. 12 is a sectional view of the instrumental unit capable of being derived from the related-art rotary shaft support structure. In addition, in the instrumental unit of the comparative example shown in FIG. 12, members to which the same numerals as those of the instrumental unit 1 according to the embodiment are assigned are the members already described, so that the description is omitted.

In the instrumental unit capable of being derived from the related-art rotary shaft support structure as described above, a controlling spring 9' having a function substantially similar to the controlling spring 9 of the embodiment is installed under an output gear 7 (the side of a lower case 4A). As a result, an elastic force of the controlling spring 9' acts on the output gear 7 upwardly. With this, the rotary shaft 8 is also urged in a direction of the distal end provided with an indicator when the rotary shaft 8 is integrally provided with the output gear 7.

Therefore, in the light guiding combined type as described above, an end face 8A of the lower side of the rotary shaft 8 tends to be distant from an light source 3 opposed to this end face 8A (in FIG. 12, the end face 8A of the lower side of the rotary shaft 8 is distant from the light source 3 by a distance S'). As a result, by the distance distant from the light source, light emitted from the light source is leaked and effective light guiding cannot be exerted to lead to a decrease in light guiding efficiency.

On the other hand, in the instrumental unit 1 according to the embodiment of the invention, the rotary shaft 8 is depressed toward the downward portion including the light source 3, so that an approaching state is always held at the distance S between the light source 3 and the end face 8A of the lower end side of the rotary shaft 8. As a result, while minimizing a leak of illuminating light emitted from the light source 3 to the outside, the illuminating light can be captured from the end face 8A to the rotary shaft 8. As a result, the light guiding performance improves.

In addition, as described above, by the controlling spring 9 assembled in a state pinched between the spring pressing member 44 and the recess 72 of the output gear 7, at least a part of the region of the lower end surface 44A of the spring pressing member 44 always abuts on the upper surface portions of the long side parts 9A of the wing parts 93 of the controlling spring 9. On the other hand, the controlling spring 9 turns with the output gear 7 while torque from the step motor 5 is transmitted and the output gear 7 turns. In addition, when a static frictional force between the lowest surfaces 9B of the controlling spring 9 and upper surfaces of the pedestals 73 of the recess 72 is greater than a dynamic frictional force between upper surfaces of the long side parts 9A of the controlling spring 9 and the lower end surface 44A of the spring pressing member 44, a situation in which the controlling spring 9 is slightly dragged inside the recess 72 and rattles can be avoided.

Therefore, when the controlling spring 9 turns with the output gear 7, two regions in any of all directions on the lower end surface 44A of the cylindrical spring pressing member 44 always slide on the long side parts 9A of the upper surface of the controlling spring 9. Also, the upper surface 42D of the bearing 42A for supporting the output gear 7 supports the lower surface 7B of the output gear 7 from the lower side, so that the upper surface of the bearing 42A also always slides on the lower surface 7B of the output gear 7 unless the output gear 7 is displaced upwardly while the output gear 7 turns.

Next, action of the embodiment will be described.

For example, even when a small swing occurs in the step motor 5 itself or backlash occur in a bearing portion of the rotary shaft 8 and the rotary shaft 8 causes vibrations, the controlling spring 9 having a stable spring load can effectively absorb these vibrations. Therefore, a small swing of the rotary shaft 8 can be prevented.

Also, for example, when some shock acts on the vehicle body side while driving and its shock is also given to the lower case 4A (similarly the upper case 4B) of the motor case 4 through the substrate 2, its shock force propagates from the bearing 42A constructing the lower bearing of the side of an inner surface (floor surface) of the lower case 4A to the output gear 7 and the controlling spring 9 received in the recess 72 of the output gear 7.

Then, this controlling spring 9 is elastically deformed and thereby, the shock force is absorbed to damp vibration. Also, as necessary, according to the elastic displacement, the output gear 7 slides in a shaft direction within a necessary play range with respect to the pinion 62 longer formed in a shaft direction of the intermediate gear 6 meshing with this output gear 7.

In this manner, the shock is effectively inhibited from propagating to the rotary shaft 8 integrally provided with the output gear 7. As a result, even when the shock from the outside acts on the vehicle body, sway and a small swing of the rotary shaft 8 and the indicator attached to the top of this rotary shaft 8 can be inhibited surely.

Next, action at the time when the indicator (not shown) of the instrumental unit 1 according to the embodiment is pulled up in the upward (Z) direction and is pulled out of the distal end of the rotary shaft 8 will be described.

When the indicator is pulled up in the upward (Z) direction and is pulled out of the distal end of the rotary shaft 8, the rotary shaft 8 to which the indicator is press-fitted may be together pulled up in the upward direction. In this case, the portion of the lower surface 7B just under the recess 72 of the output gear 7 is separated from the upper surface 42D of the bearing 42A on the side of the floor surface 4C of the lower case 4A.

Also, the main wheel 71 of the output gear 7 upwardly moves within the play range described above while meshing with the pinion 62. That is, when the indicator is pulled out of the rotary shaft 8, the output gear 7 integrally provided with the rotary shaft 8 is together dragged and tends to upwardly move greatly. As a result, the controlling spring 9 is pressed in a direction of changing in a flat state by the spring pressing member 44 and the pedestals 73 of the recess 72. In an extreme case, the controlling spring 9 is crushed. However, in the embodiment, the stopper member 45 is installed, so that the output gear 7 is inhibited from being upwardly moved to a position in which the controlling spring 9 changes in the flat state.

That is, by installing the stopper member 45, the controlling spring 9 can be inhibited from being strongly pinched between the pedestals 73 of the bottom surface of the recess 72 and the lower end surface 44A of the spring pressing member 44. As a result, a situation in which stress more than or equal to the elastic limit acts on the controlling spring and the controlling spring 9 becomes crushed and is plastically deformed can be avoided. That is, trouble in which necessary elastic characteristics cannot be maintained and the elastic characteristics change or in an extreme case, an elastic force disappears can be avoided. Consequently, the need for work of replacement with a new controlling spring 9 associated with poor elasticity of the controlling spring 9 is eliminated. Incidentally, according to the embodiment, using a curved shape of the controlling spring 9, an operation of gripping the controlling spring 9 can be performed surely, so that it becomes easy to do work of arrangement of the controlling spring 9 in the recess 72 of the output gear 7.

Therefore, according to the embodiment, the step motor 5, the intermediate gear 6, the output gear 7, the rotary shaft 8 integrally provided with the output gear 7 and the controlling spring 9 shown in FIG. 2 are assembled in predetermined positions and are accommodated in the lower case 4A. Thereafter, when the upper case 4B is integrally fitted from the upper portion of the lower case 4A to complete assembly, the main part becomes assembled as shown in FIG. 3. That is, the long side parts 9A and the lowest surfaces 9B of the controlling spring 9 are respectively pinched from the vertical direction in a state abutting on the lower end surface 44A of the spring pressing member 44 and the pedestals 73 of the bottom surface of the recess 72 formed in the output gear 7. Also, a state having a predetermined gap, namely play between the lower end surface 45A of the stopper member 45 and the upper surface 7A of the output gear 7 is obtained.

In this state, the output gear 7 is in a state of serration engagement with the pinion 62 of the intermediate gear 6. Therefore, by elastically deforming the controlling spring 9 within the play range so as to change a vertical thickness, the output gear 7 can be displaced vertically along the axis line direction of the longish pinion 62. Consequently, a small swing of the rotary shaft 8 can be absorbed.

Also, according to the embodiment, the wing parts 93 of the controlling spring 9 have substantially a U-shaped cross section and thereby, the lower end surface 44A of the spring pressing member 44 can make line (or surface) contact with the long side parts 9A of the controlling spring 9 as shown in FIG. 3. As a result, the minimum contact state can be obtained, stated differently, a frictional force can be minimized. Therefore, even when the controlling spring 9 configured to rotate with the output gear 7 rotates while making sliding contact with the spring pressing member 44, a smooth turning movement can be obtained without interfering with rotation of the output gear 7 rotating with the controlling spring 9.

In addition, the invention is not limited to the embodiment described above, and various forms can be performed without departing from the gist of the invention.

For example, it is unnecessary that the bearing 42A on the side of the floor surface 4C of the lower case 4A for pivotally supporting the lower side of the rotary shaft 8 functions as means for supporting the output gear 7 from the lower side. That is, as an alternative, a member for supporting the lower surface 7B corresponding to the recess 72 of the output gear 7 can be erected separately from the floor surface.

Further, in the embodiment, the controlling spring 9 is constructed of a metallic thin plate, but is not limited to the thin plate as long as a similar effect can be obtained.

Also, the instrumental unit of the invention can be applied to the meter apparatus of various instruments and the like, for example, a fuel gauge part, a tachometer part, a speedometer part and a water temperature gauge.

According to an aspect of the invention, a load spring having a stable controlling movement can be obtained, so that a smooth turning movement of the rotary shaft and the indicator can be obtained and thus a smooth rotational movement of the indicator can be implemented. Further, in the instrumental unit including the rotary shaft of a light guiding combined type, light guiding performance is not decreased.

According to an aspect of the invention, the spring pressing member always makes contact with at least a part of the controlling spring and thereby, when the controlling spring rotates with the rotary shaft and the gear for accommodating the controlling spring, a load on the gear can always be generated in the controlling spring by a pressing movement of the spring pressing member. As a result, the turning movement of the rotary shaft can be stabilized.

According to an aspect of the invention, using the curved shape of the controlling spring, an operation of gripping the controlling spring can be performed surely, so that it becomes easy to do work of arrangement in the recess of the gear. Moreover, since both end sides of the long axis direction of the controlling spring have the folded shapes in a direction separate from the recess, a function of sliding on the recess in the folded shape portion can be improved and when the controlling spring is pressed and bent, a smooth slide movement can be implemented.

According to an aspect of the invention, a situation in which the gear and the rotary shaft to which the indicator is assembled are together pulled up, for example, beyond a predetermined range in the case of detaching the indicator, that is, pulling the indicator from the distal end of the rotary shaft, can be avoided by the stopper member which functions as a prop. Consequently, a situation in which the controlling spring pinched between the case and the gear is pressed more than necessary and changes in a flat state and the elastic force disappears can be prevented.

According to an aspect of the invention, the invention can be implemented by slightly improving a bearing and a shaft hole formed in a case of a related-art instrumental unit.

According to an aspect of the invention, the stable load spring always acts on the rotary shaft and also the smooth turning movement of the rotary shaft can be obtained and thus the smooth rotational movement of the indicator can be obtained. Moreover, the light guiding performance is not decreased, and the invention is further suitable for miniaturization and thinning of the case of the instrumental unit.

What is claimed is:

1. An instrumental unit comprising:
a step motor;
a gear including:
a gear body configured to be rotated by torque of the step motor, the gear body including a first surface formed with a recess and a second surface opposite to the first surface; and
a rotary shaft projecting from the first and second surfaces of the gear body;
a controlling spring accommodated in the recess of the first surface of the gear body, having a center through which the rotary shaft projects, the controlling spring having lengths in a long axis direction and in a short axis direction which are orthogonal to each other and having a line-symmetric shape with respect to each of the long and short axis directions; and
a case accommodating the step motor, the gear body and the controlling spring, an inner surface of the case including:
a first portion supporting the second surface of the gear body; and
a second portion configured to press the controlling spring in the recess of the first surface of the gear body.

2. The instrumental unit according to claim 1, wherein
the controlling spring has an oval shape or an elliptic shape and a hole through which the rotary shaft projects is formed through the controlling spring, and
the second portion includes a spring pressing member which projects from the inner surface of the case toward the controlling spring and an end surface of which is configured to be in contact with the controlling spring.

3. The instrumental unit according to claim 2, wherein
the controlling spring is a leaf spring in which: a cross section along the long axis direction has a shape curved in substantially a U shape toward the first portion of the inner surface of the case; a cross section along the short axis direction has a shape curved in substantially a U shape toward the second portion of the inner surface of the case; and both end portions in the long axis direction have folded shapes warped in a direction apart from the recess of the first surface of the gear body.

4. The instrumental unit according to claim 2, wherein
the inner surface of the case includes a stopper member an end surface of which is capable of being in contact with the first surface of the gear body, and
a distance between the end surface of the stopper member and the first surface of the gear body is less than a distance between the end surface of the spring pressing member and a bottom surface of the recess of the first surface of the gear body.

5. The instrumental unit according to claim 1, wherein
the first portion of the inner surface of the case includes a bearing which supports the rotary shaft projecting from the second surface of the gear body, and
the second portion of the inner surface of the case includes a shaft hole which supports the rotary shaft projecting from the first surface of the gear body.

* * * * *